United States Patent
Proefke et al.

(10) Patent No.: US 8,944,477 B2
(45) Date of Patent: Feb. 3, 2015

(54) CHARGE PORT LOCK ASSEMBLY FOR A VEHICLE

(75) Inventors: David T. Proefke, Madison Heights, MI (US); Andrew J. Farah, Troy, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 917 days.

(21) Appl. No.: 12/911,840

(22) Filed: Oct. 26, 2010

(65) Prior Publication Data

US 2012/0098278 A1 Apr. 26, 2012

(51) Int. Cl.
*E05C 1/06* (2006.01)
*B60L 11/18* (2006.01)

(52) U.S. Cl.
CPC ......... *B60L 11/1818* (2013.01); *B60L 2270/32* (2013.01); *B60L 2270/34* (2013.01); *Y02T 10/7005* (2013.01); *Y02T 10/7088* (2013.01); *Y02T 90/121* (2013.01); *Y02T 90/14* (2013.01)
USPC .......................................... 292/144; 439/147

(58) Field of Classification Search
USPC ................ 292/144; 439/34, 345, 147 X, 352; 320/109 X
See application file for complete search history.

(56) References Cited

U.S. PATENT DOCUMENTS

| | | | | |
|---|---|---|---|---|
| 5,264,776 A | * | 11/1993 | Hulsey | 320/108 |
| 7,794,280 B1 | * | 9/2010 | Markyvech | 439/620.29 |
| 8,075,329 B1 | * | 12/2011 | Janarthanam et al. | 439/304 |
| 2009/0242291 A1 | * | 10/2009 | Sagawa et al. | 180/65.265 |
| 2011/0227531 A1 | * | 9/2011 | Rajakaruna | 320/109 |
| 2011/0264319 A1 | * | 10/2011 | Chander et al. | 701/22 |
| 2011/0300733 A1 | * | 12/2011 | Janarthanam et al. | 439/304 |
| 2013/0009598 A1 | * | 1/2013 | Ohtomo | 320/109 |
| 2013/0089999 A1 | * | 4/2013 | Martin | 439/345 |

FOREIGN PATENT DOCUMENTS

| | | |
|---|---|---|
| DE | 19744905 A1 | 4/1999 |
| DE | 102007002025 A1 | 7/2008 |
| DE | 102009011088 A1 | 9/2010 |

* cited by examiner

*Primary Examiner* — Mark Williams

(57) ABSTRACT

A charge port lock assembly for use with a charge receptacle on a vehicle having a rechargeable battery. The charge port lock assembly may include an actuator assembly including an actuator energizable to retract the post to a retracted position and to move to an extended rest position and a partially retracted rest position; a charge port door that covers the charge receptacle and a has a door ejection spring; a charge door lock assembly that releases the charge port door when the post is in the fully retracted position and retains the charge port door in the closed position when the post is in the other positions; a cord lock assembly that retains a charge cord assembly in the charge receptacle when the post is in the extended rest position and releases the charge cord assembly in the other positions. The controller energizes the actuator.

20 Claims, 2 Drawing Sheets

CHARGE PORT LOCK ASSEMBLY FOR A VEHICLE

BACKGROUND OF INVENTION

The present invention relates generally to charging systems for electric and hybrid electric types of vehicles, and more particularly to selectively retaining a charge port door and a charging plug during battery charging and other times when not charging the battery.

Some recent automotive vehicles employ on-board battery packs that can be charged while the vehicle is parked. For these vehicles, one end of a plug may be inserted into an electrical outlet in a garage, for example, and the other end is plugged into a receptacle in the vehicle. While plugged in, the vehicle batteries charge, thus providing the driver with maximum operating range on battery when the vehicle is next used.

SUMMARY OF INVENTION

An embodiment contemplates a charge port lock assembly for use with a charge receptacle on a vehicle having a rechargeable battery. The charge port lock assembly may comprise an actuator assembly, a charge port door, a charge door lock assembly, a cord lock assembly and a controller. The actuator assembly includes an actuator having a post extending therefrom, the actuator energizable to retract the post to a fully retracted position and to move to an extended rest position and a partially retracted rest position after being energized. The charge port door selectively covers access to the charge receptacle and has a door ejection spring that biases the charge port door toward an open position. The charge door lock assembly releases the charge port door when the post is in the fully retracted position and retains the charge port door in the closed position when the post is in the extended rest position and the partially retracted rest position. The cord lock assembly retains a charge cord assembly in the charge receptacle when the post is in the extended rest position and releases the charge cord assembly when the post is in the partially retracted rest position and the fully retracted position. The controller selectively energizes and de-energizes the actuator.

An embodiment contemplates a method of controlling a charge port lock assembly, the method comprising the steps of: energizing an actuator to move a post to a temporary fully retracted position thereby releasing a charge port door, if a vehicle door is locked, the charge port door is closed and a charge port door release button is actuated; de-energizing the actuator to move the post to a partially retracted rest position; energizing and de-energizing the actuator to move the post to the fully extended rest position; inserting a charge cord housing into a charge receptacle to thereby lock a retainer arm of the charge cord housing in the charge receptacle; and actuating a vehicle door unlock button to thereby cause the actuator to be energized and de-energized to move the post to the partially retracted rest position, the post moving to the partially retracted rest position releasing the retainer arm from the charge cord receptacle.

An advantage of an embodiment is that the charge cord assembly can be easily locked into the charge receptacle on the vehicle so that it is not accidentally pulled out while charging. In addition, the charge cord assembly can be easily unlocked and removed when the vehicle is going to be driven. The locking and unlocking of the charge cord is accomplished in an intuitive manner, making it easy for a new vehicle owner to operate the cord lock. Also, the charge port door can be locked closed when charging is not desired, and easily opened when access to the charge receptacle is desired. Moreover, the charge plug can be inserted in the receptacle whether the charge cord assembly is locked or unlocked, and the charge port door can be easily closed and retained in the closed position when battery charging is no longer desired, whether the assembly is locked or unlocked.

A single actuator is employed to both lock/release the charge port door and to lock/release the charge cord assembly from the vehicle, thus minimizing cost and packaging space needed to accomplish these functions.

The lockable charge port door provides security to prevent others from accessing the charge receptacle, which can deter potential theft and vandalism to charge receptacle components. Also, locking of the charge cord assembly to the vehicle may avoid inadvertent removal of the charge cord while charging and deter potential theft of the charge cord assembly.

DETAILED DESCRIPTION

Figure 1:
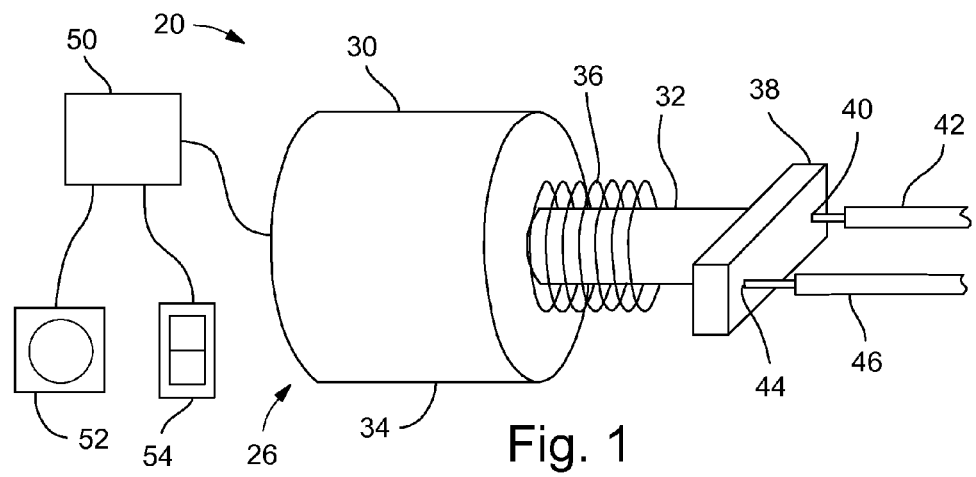
FIG. 1 is a schematic view of an actuator assembly and vehicle electronics, with an actuator shown in a fully extended rest position.

Referring to FIGS. 1-5, a charge port lock assembly 20 for use in a vehicle having a rechargeable battery is shown. The vehicle may be, for example, a battery electric vehicle, a plug-in hybrid electric vehicle, or an extended range electric vehicle. The charge port lock assembly 20 includes a cord lock assembly 22, a charge door lock assembly 24, and an actuator assembly 26. A charge cord assembly 28 is employed when connecting the vehicle to a source of electricity (not shown) during battery charging.

Figure 2:
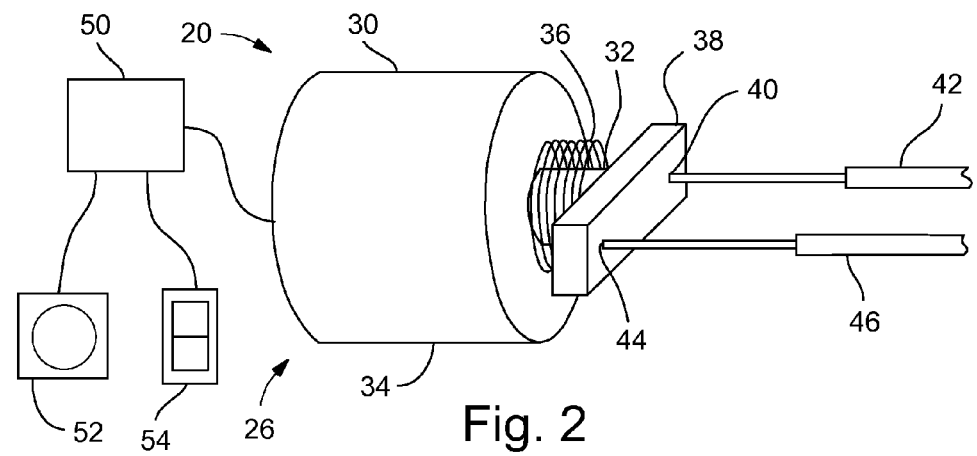
FIG. 2 is a schematic view similar to FIG. 1, but showing the actuator in a temporary fully retracted position.
Figure 3:
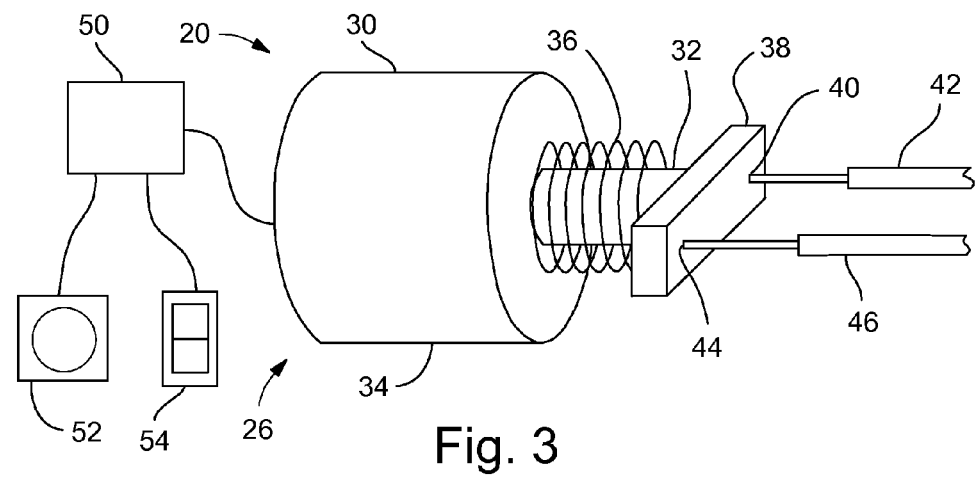
FIG. 3 is a schematic view similar to FIG. 1, but showing the actuator in a partially retracted rest position.

The actuator assembly 26 is illustrated in FIGS. 1-3 and includes an actuator 30, such as, for example, a bi-state actuator. The bi-state actuator 30 has a retractable post 32 extending from a main body 34, with a return spring 36 mounted around the post 32. A cable securement flange 38 is mounted to a distal end of the retractable post 32 and moves with the post 32. A first end 40 of a door release cable 42 and a first end 44 of a cord release cable 46 are attached to the cable securement flange 38. These cables 42, 46 may be Bowden cables that connect at their opposite ends to the cord lock assembly 22 and charge door lock assembly 24, discussed below.

The bi-state actuator 30 has two rest positions for the post 32 that it toggles between and a temporary post position that is achieved when the actuator 30 is energized. That is, the bi-state actuator 30 toggles back and forth between its fully extended rest position (shown in FIG. 1) and its partially retracted rest position (shown in FIG. 3), and, when energized, the post 32 is retracted into the temporary fully retracted position (shown in FIG. 2) and moves to the opposite rest position from the one it was just in when the power is turned off to the actuator (de-energized).

The bi-state actuator 30 is controlled by a controller 50. The controller may by a hybrid vehicle controller a body controller, a combined controller for both of these functions or a separate controller. The controller 50 can be made of various combinations of hardware and software as is known to those skilled in the art. The controller 50 may be in communication (directly or indirectly) with a charge port door release button 52 and a vehicle door lock/unlock switch or switches (buttons) 54. These buttons may be part of a key fob that transmits to the vehicle wirelessly, may be buttons mounted in the vehicle or may include additional buttons or switches to allow for both in vehicle wired and key fob wireless communication with the controller 50, if so desired. The vehicle door lock/unlock switch 54 is used primarily to lock and unlock the doors of the vehicle that occupants use to get into and out of the vehicle. This switch 54 (or key fob button) is part of a common power door lock system used in vehicles.

Figure 4:
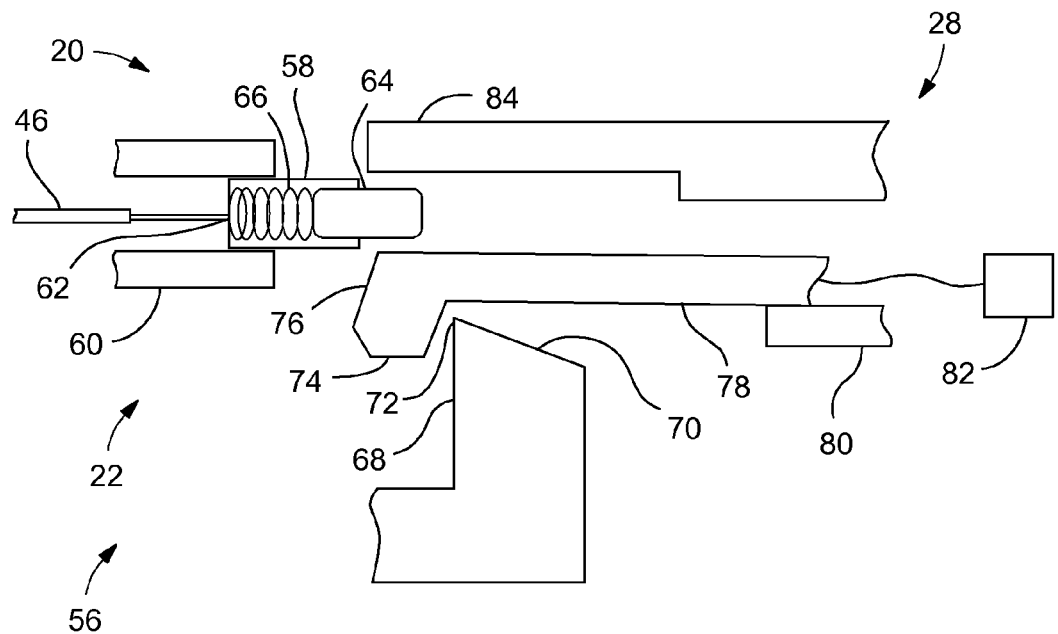
FIG. 4 is a schematic view of a cord lock assembly and a charge cord assembly.

The cord lock assembly 22 is shown in FIG. 4 and is mounted in a charge receptacle 56 of the vehicle. The assembly 22 includes a pin carrier 58 that is telescopically slidable in a guide channel 60, which is fixed relative to vehicle structure. The pin carrier 58 is attached to a second end 62 of the cord release cable 46. The movement of the cord release cable 46 by the bi-state actuator will cause the pin carrier 58 to slide back and forth in the guide channel 60. A cable lock pin 64 is mounted in the pin carrier 58 and is biased outward by a lock pin spring 66. The cable lock pin 64 is prevented from being pushed all of the way out of the pin carrier and is just slidable back and forth from an extended position (shown in FIG. 4) and a retracted position. The cord lock assembly also includes a retention flange 68 that is fixed relative to the vehicle. The retention flange 68 includes a sloped insertion ramp 70 and a catch 72.

The sloped insertion ramp 70 and the catch 72 are formed to engage with a retention flange 74 on a terminal end 76 of a retainer arm (handle latch) 78 extending from a charge cord housing 80 of the charge cord assembly 28. The retainer arm 78 is retained by the charge cord housing 80, but can pivot relative to the housing 80 to allow for insertion of the charge cord housing 80 into and removal from the charge receptacle 56. The charge cord assembly 28 also includes a release trigger (button) 82 that causes the retainer arm 78 to pivot when pressed. When the charge cord housing 80 is inserted all of the way into the charge receptacle 56, an outer flange 84 of the housing 80 may extend adjacent to the cable lock pin 64 opposite the distal end of the retainer arm 78.

Figure 5:
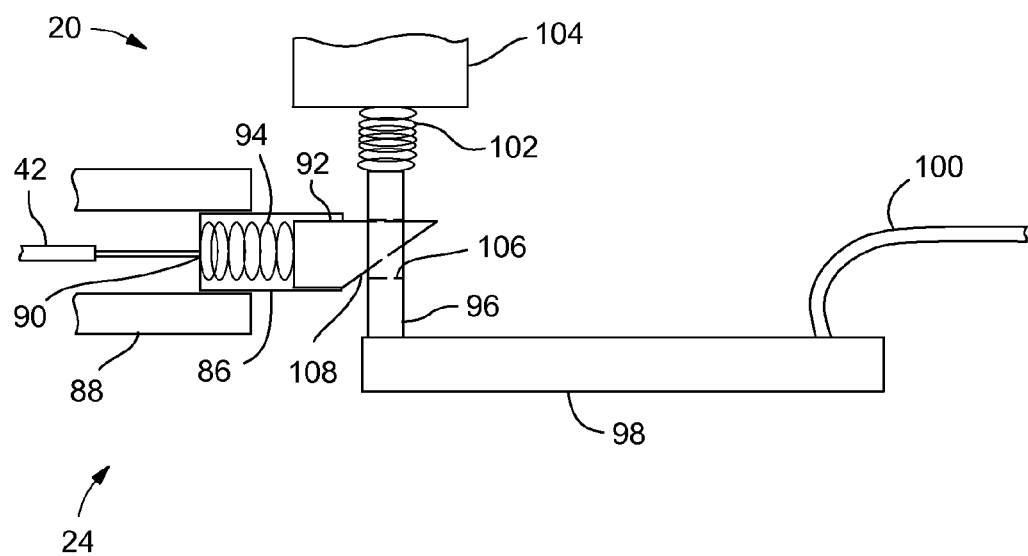
FIG. 5 is a schematic view of a charge door lock assembly and a charge port door.

The charge door lock assembly 24 is shown in FIG. 5 and covers the access opening to the charge receptacle of the vehicle. The assembly 24 includes a pin carrier 86 that is telescopically slidable in a guide channel 88, which is fixed relative to vehicle structure. The pin carrier 86 is attached to a second end 90 of the door release cable 42. The movement of the door release cable 42 by the bi-state actuator will cause the pin carrier 86 to slide back and forth in the guide channel 88. A door lock pin 92 is mounted in the pin carrier 86 and is biased outward by a lock pin spring 94. The door lock pin 92 is prevented from being pushed all of the way out of the pin carrier and is just slidable back and forth from an extended position (shown in FIG. 5) and a retracted position.

The charge door lock assembly 24 also includes a door retention flange 96 that is fixed relative to a charge port door 98. The charge port door 98 is mounted on a door hinge 100, which is mounted at a distal end to vehicle structure (not shown). The charge port door 98 is pivotable between a closed position (shown in FIG. 5) and an open position that allows access to the charge receptacle.

When the charge port door 98 is closed, the door retention flange presses against a door ejection spring 102, which is mounted to vehicle structure 104. Thus, the charge port door 98 is biased away from its fully closed position. It is held in its fully closed position when the door lock pin 92 is engaged in a door retention cutout 106 of the door retention flange 96. The door retention flange 96 has a sloped insertion ramp 108 that allows the door retention flange 96 to push the door lock pin 92 out of the way, against the bias of the lock pin spring 94, even when the pin carrier 86 fully extends the door lock pin 92 into the charge receptacle.

Operation of the charge port lock assembly 20 shown in FIGS. 1-5 will now be discussed. This operation allows for the locking and unlocking of both the charge port door 98 and the charge cord assembly 22 employing a single actuator. It also allows for the charge port door 98 to be closed and the charge cord assembly 22 to be inserted into the charge receptacle 56 (assuming the door is open) whether the cord lock assembly 22 and charge door lock assembly 24 are in the locked or unlocked positions, thus making the use of this system by a vehicle operator simple and intuitive.

If the vehicle doors are locked and the charge port door is closed, and one actuates the charge port door release button 52, then the controller 50 causes the actuator 30 to be energized, moving the post 32 from the extended rest position (shown in FIG. 1) to the temporary fully retracted position (shown in FIG. 2). This causes the cable securement flange 38 to pull on the cables 42, 46, which, in turn, fully retracts the pin carriers 58, 86. The door lock pin 92 is pulled out of the door retention cutout 106, which allows the door ejection spring 102 to push the door 98 open. The actuator is energized for only a short time (long enough to allow the charge port door 98 to be opened) and then de-energized, causing the retractable post 32 to return to a partially retracted rest position (shown in FIG. 3). Since the vehicle doors are locked, the controller 50 will then immediately energize and de-energize the actuator 30 again, causing the post 32 to return to the extended rest position (FIG. 1).

Even though the cord lock assembly 22 is now in a locked position (with the pin carrier 58 extended), the charge cord housing 80 can be inserted into the cord lock assembly 22. As the housing 80 is inserted into the charge receptacle 56, the retention flange 74 of the retainer arm 78 will slide along the sloped retention ramp 70 and push in on the end of the cable lock pin 64 against the bias of the lock pin spring 66. When the retention flange 74 passes over the catch 72, it will snap down over the catch 72, allowing the cable lock pin 64 to pop back out of the pin carrier 58. The charge cord housing 80 is now locked in the charge receptacle 56 as the cable lock pin 64 prevents the retention flange 74 from rising high enough to lift over the catch 72.

With the charge cord assembly 28 locked into the receptacle 56, if one wishes to finish battery charging and remove the charge cord, he actuates the door unlock switch (or button as the case may be) 54 to cause the vehicle doors to unlock. At the same time, the controller 50 will energize the actuator 30, causing it to move from the extended rest position (FIG. 1) to the temporary fully retracted position (FIG. 2) and de-energize the actuator 30 to allow the post 32 to move to the partially retracted rest position (FIG. 3). The size and positioning of the components in the cord lock assembly 22 are such that the cable lock pin 64 will not block removal of the retainer arm 78 in either the actuator fully retracted position (FIG. 2) or the partially retracted rest position (FIG. 3). Thus, after one actuates the vehicle door unlock button, the charge cord assembly 28 can be removed by activating the release trigger 82 to raise the retention flange 74 relative to the catch 72, and pulling the housing 80 out of the charge receptacle 56.

After removing the charge cord assembly 28, one can pivot the charge port door 98 toward the closed position. As the door retention flange 96 contacts the sloped insertion ramp 108 on the door lock pin 92, the door lock pin 92 will be retracted into the pin carrier 86 against the bias of the lock pin spring 94 until the door lock pin 92 aligns with the door retention cutout 106, at which time the pin 92 will be pushed into the cutout 106, locking the charge port door 98 in a closed position. As the door 98 is being pushed closed, the door retention flange 96 will also compress the door ejection spring 102, so the door 98 is ready to spring open in the future.

The size and positioning of the components in the charge door lock assembly 24 are such that the door lock pin 92 will lock the door 98 in a closed position in both the fully extended rest position (FIG. 1) and the partially retracted rest position (FIG. 3). The only situation where the pin 92 would not engage the door retention flange 96 is in the temporary fully retracted position (FIG. 2), which only occurs when the actuator 30 is energized.

If the vehicle doors are unlocked and the charge port door is closed, and one actuates the charge port door release button 52, then the controller 50 causes the actuator 30 to be energized, moving the post 32 from the partially retracted rest position (FIG. 3) to the temporary fully retracted position (FIG. 2). This causes the cable securement flange 38 to pull on the cables 42, 46, which, in turn fully retracts the pin carriers 58, 86. The door lock pin 92 is pulled out of the door retention cutout 106, which allows the door ejection spring 102 to push the door 98 open. The actuator is energized for only a short time (long enough to allow the charge port door 98 to be opened) and then de-energized, causing the retractable post 32 to return to a extended rest position (FIG. 1). Since the vehicle doors are unlocked, the controller 50 will then immediately energize and de-energize the actuator 30 again, causing the post 32 to return to the partially retracted rest position (FIG. 3).

In this partially retracted rest position, the charge cord housing 80 can, of course, be inserted into the charge receptacle 56, but it will not be locked in. To lock the charge cord housing 80 into the receptacle 56, one actuates the door lock button 54, in which case the controller 50 will briefly energize and de-energize the actuator 30 (if the charge port door 98 is open) to move the retractable post 32 back to the extended rest position (FIG. 1). When done charging, pressing the button 54 to unlock the vehicle doors will energize and de-energize the actuator (if the charge port door 98 is open) to move the retractable post 32 back to the partially retracted rest position (FIG. 3), allowing the charge cord assembly 28 to be removed from the charge receptacle 56. If the charge port door 98 is not open, then the vehicle door lock and unlock requests from the door lock switch (button) 54 will not cause the actuator to be energized. This prevents the charge port door 98 from being opened when the vehicle operator merely wants to lock or unlock the vehicle doors themselves. Many types of conventional sensors (not shown) could be employed to detect when the charge port door 98 is open.

As an alternative, the actuator assembly 26 shown in FIGS. 1-3 may employ an actuator where the retractable post is moved in opposite directions by reversing the polarity applied to the actuator 30, rather than a bi-stable actuator that toggles between the fully extended and partially retracted rest positions. That is, the actuator 30, when energized with a first polarity when the retractable post 32 is in a fully extended position (FIG. 1) will retract the post 32 to the temporary full retracted position (FIG. 2), and, when de-energized, the post 32 will move to the partially retracted rest position (FIG. 3) (due to the return spring 36 or other means). When the post 32 is in the partially retracted rest position (FIG. 3) and energized with a second, opposite polarity, the post 32 will move out to the extended rest position (FIG. 1). After de-energizing, the post 32 will remain in this extended rest position. In addition, if the post 32 is in the partially retracted position (FIG. 3), and the actuator 30 is energized with the first polarity, the post 32 will move to the temporary fully retracted position (FIG. 2). When de-energized, the post 32 will return to the partially retracted rest position (FIG. 3). The reversal of polarity can be achieved, for example, by an H-bridge that allows for switching to cause the voltage to be applied across an electronic element, such as a motor, in one direction or the other. The H-bridge may be, for example, included with the controller or be a separate component connected between the controller and the actuator.

The cord lock assembly 22 and the charge door lock assembly 24 may be the same, whichever type of actuator 30 is employed.

The operation of the charge port lock assembly 20 employing this actuator rather than the bi-state actuator that toggles will be slightly different. For example, if the vehicle doors are locked and the charge port door is closed, and one actuates the charge port door release button 52, then the controller 50 causes the actuator 30 to be energized with a first polarity, moving the post 32 from the extended rest position to the temporary fully retracted position. This causes the securement flange 38 to pull on the cables 42, 46, which, in turn, fully retracts the pin carriers 58, 86. The door lock pin 92 is pulled out of the door retention cutout 106, which allows the door ejection spring 102 to push the door 98 open. The actuator is energized for only a short time (long enough to allow the charge port door 98 to be opened) and then de-energized, causing the retractable post 32 to return to a partially retracted rest position. Since the vehicle doors are locked, the controller 50 will then immediately energize the actuator 30 again with the second polarity, causing the post 32 to return to the extended rest position. The time period for energizing the actuator will be based on a sufficient time needed to move the post 32 to the extended rest position.

In another example of the change in operation when this other actuator is used, with the charge cord assembly 28 locked into the receptacle 56, if one wishes to finish battery charging and remove the charge cord, he actuates the door unlock switch 54 to cause the vehicle doors to unlock. At the same time, the controller 50 will energize the actuator 30 with the first polarity, causing it to move from the extended rest position to the temporary fully retracted position and de-energize the actuator 30 to allow the post 32 to move to the partially retracted rest position. Thus, after one actuates the vehicle door unlock button, the charge cord assembly 28 can be removed by activating the release trigger 82 to raise the retention flange 74 relative to the catch 72, and pulling the housing 80 out of the charge receptacle 56.

One other example where the operation may change somewhat with the later discussed actuator 30 is the case where, if the vehicle doors are unlocked and the charge port door is closed, and one actuates the charge port door release button 52, then the controller 50 causes the actuator 30 to be energized with the first polarity, moving the post 32 from the partially retracted rest position to the temporary fully retracted position. This causes the cable securement flange 38 to pull on the cables 42, 46, which, in turn fully retracts the pin carriers 58, 86. The door lock pin 92 is pulled out of the door retention cutout 106, which allows the door ejection spring 102 to push the door 98 open. The actuator is energized for only a short time (long enough to allow the charge port door 98 to be opened) and then de-energized, causing the retractable post 32 to return to partially retracted rest position. With the actuator 30 in the partially retracted position and the vehicle doors are unlocked, the controller 50 does not need to take any further action.

In this partially retracted rest position, the charge cord housing 80 can, of course, be inserted into the charge receptacle 56, but it will not be locked in. To lock the charge cord housing 80 into the receptacle 56, one actuates the door lock button 54, in which case the controller 50 will briefly energize the actuator 30 with the second polarity long enough to move the retractable post 32 back to the extended rest position. When done charging, pressing the button 54 to unlock the vehicle doors will briefly energize the actuator, but only long enough to move the retractable post 32 back to the partially retracted rest position—not so long as to allow the post 32 to move all of the way to the fully retracted position. This allows the charge cord assembly 28 to be removed from the charge receptacle 56 without inadvertently opening the charge port door 98 when not intended.

While certain embodiments of the present invention have been described in detail, those familiar with the art to which this invention relates will recognize various alternative designs and embodiments for practicing the invention as defined by the following claims.

What is claimed is:

1. A charge port lock assembly for use with a charge receptacle on a vehicle having a rechargeable battery, the charge port lock assembly comprising:
    an actuator assembly including an actuator having a post extending therefrom, the actuator energizable to retract the post to a fully retracted position and to move to an extended rest position and a partially retracted rest position after being energized;
    a charge port door configured to selectively cover access to the charge receptacle and a door ejection spring configured to bias the charge port door toward an open position;
    a charge door lock assembly configured to release the charge port door when the post is in the fully retracted position and to retain the charge port door in the closed position when the post is in the extended rest position and the partially retracted rest position;
    a cord lock assembly configured to retain a charge cord assembly in the charge receptacle when the post is in the extended rest position and release the charge cord assembly when the post is in the partially retracted rest position and the fully retracted position; and
    a controller for selectively energizing and de-energizing the actuator.

2. The charge port lock assembly of claim 1 including a door release cable having a first end movable with the post and a second end connected to the charge door lock assembly.

3. The charge port lock assembly of claim 2 wherein the charge port door includes a door retention flange having a door retention cutout, and the charge door lock assembly includes a pin carrier attached to the second end of the door release cable, a door lock pin telescopically slidable in the pin carrier and a lock pin spring mounted between the pin carrier and the door lock pin biasing the door lock pin toward the door retention flange, wherein when the post is in the extended rest position or the partially retracted rest position and the charge port door is closed, the door lock pin is engaged in the retention cutout thereby retaining the charge port door in the closed position.

4. The charge port lock assembly of claim 3 wherein the door lock pin includes a sloped insertion ramp facing toward the charge port door, and the door lock pin is configured to slide into the pin carrier against the bias of the lock pin spring when the door retention flange engages the sloped insertion ramp as the charge port door is being moved toward a closed position.

5. The charge port lock assembly of claim 1 including a cord release cable having a first end movable with the post and a second end connected to the cord lock assembly.

6. The charge port lock assembly of claim 5 wherein cord lock assembly includes a pin carrier attached to the second end of the cord release cable, a door lock pin telescopically slidable in the pin carrier, a lock pin spring mounted between the pin carrier and the door lock pin biasing the door lock pin away from the second end of the cable, and a retention flange mounted adjacent to the door lock pin and fixed relative to the vehicle, wherein when the post is in the extended rest position the door lock pin prevents a retainer arm on the charge cord assembly from releasing from a catch on the retention flange, and when the post is in the partially retracted rest position, the door lock pin does not prevent the retainer arm on the charge cord assembly from releasing from the catch on the retention flange.

7. The charge port lock assembly of claim 6 wherein the retention flange includes a sloped insertion ramp that is configured to be engageable with the retainer arm to cause the retainer arm to slide up the sloped retention surface and push the door lock pin against the bias of the lock pin spring to allow the retainer arm to engage the catch when the post is in the extended rest position.

8. The charge port lock assembly of claim 7 including a charge port door release button in communication with the controller, the controller configured to energize and de-energize the actuator when the charge port door release button is actuated.

9. The charge port lock assembly of claim 1 including a charge port door release button in communication with the controller, the controller configured to energize and de-energize the actuator when the charge port door release button is actuated.

10. The charge port lock assembly of claim 9 including a vehicle door lock/unlock switch configured to communicate with the controller.

11. The charge port lock assembly of claim 1 wherein the actuator is a bi-stable actuator that toggles between the extended rest position and the partially retracted rest position after being energized and de-energized.

12. The charge port lock assembly of claim 1 wherein the actuator is controllable to move to the fully retracted position when the actuator is energized with a first polarity and is controllable to move to the extended rest position when the actuator is energized with a second, opposite polarity.

13. The charge port lock assembly of claim 12 wherein the actuator assembly includes a return spring configured to bias the post into the partially retracted rest position after de-energizing the actuator when the post is in the fully retracted position.

14. A charge port lock assembly for use with a charge receptacle on a vehicle having a rechargeable battery, the charge port lock assembly comprising:
    an actuator assembly including an actuator having a post extending therefrom, the actuator energizable to retract the post to a fully retracted position and to move to an extended rest position and a partially retracted rest position after being energized;
    a charge port door configured to selectively cover access to the charge receptacle and a door ejection spring configured to bias the charge port door toward an open position;

a charge door lock assembly configured to release the charge port door when the post is in the fully retracted position and to retain the charge port door in the closed position when the post is in the extended rest position and the partially retracted rest position;

a cord lock assembly configured to retain a charge cord assembly in the charge receptacle when the post is in the extended rest position and release the charge cord assembly when the post is in the partially retracted rest position and the fully retracted position;

a controller for selectively energizing and de-energizing the actuator;

a cord release cable having a first end movable with the post and a second end connected to the cord lock assembly; and wherein the cord lock assembly includes a pin carrier attached to the second end of the cord release cable, a cable lock pin telescopically slidable in the pin carrier, a lock pin spring mounted between the pin carrier and the cable lock pin biasing the cable lock pin away from the second end of the cable, and a retention flange mounted adjacent to the cable lock pin and fixed relative to the vehicle, wherein when the post is in the extended rest position the cable lock pin prevents a retainer arm on the charge cord assembly from releasing from a catch on the retention flange, and when the post is in the partially retracted rest position, the cable lock pin does not prevent the retainer arm on the charge cord assembly from releasing from the catch on the retention flange.

15. The charge port lock assembly of claim 14 wherein the retention flange includes a sloped insertion ramp that is configured to be engageable with the retainer arm to cause the retainer arm to slide up the sloped retention surface and push the cable lock pin against the bias of the lock pin spring to allow the retainer arm to engage the catch when the post is in the extended rest position.

16. The charge port lock assembly of claim 15 including a charge port door release button in communication with the controller, the controller configured to energize and de-energize the actuator when the charge port door release button is actuated.

17. The charge port lock assembly of claim 14 including a door release cable having a first end movable with the post and a second end connected to the charge door lock assembly.

18. The charge port lock assembly of claim 17 wherein the charge port door includes a door retention flange having a door retention cutout, and the charge door lock assembly includes a pin carrier attached to the second end of the door release cable, a door lock pin telescopically slidable in the pin carrier and a lock pin spring mounted between the pin carrier and the door lock pin biasing the door lock pin toward the door retention flange, wherein when the post is in the extended rest position or the partially retracted rest position and the charge port door is closed, the door lock pin is engaged in the retention cutout thereby retaining the charge port door in the closed position.

19. The charge port lock assembly of claim 14 wherein the actuator is a bi-stable actuator that toggles between the extended rest position and the partially retracted rest position after being energized and de-energized.

20. The charge port lock assembly of claim 14 wherein the actuator is controllable to move to the fully retracted position when the actuator is energized with a first polarity and is controllable to move to the extended rest position when the actuator is energized with a second, opposite polarity.

* * * * *